No. 853,785. PATENTED MAY 14, 1907.
G. J. HENRY, Jr.
SAFETY MEANS FOR FLUID PRESSURE LINES.
APPLICATION FILED AUG. 29, 1905.
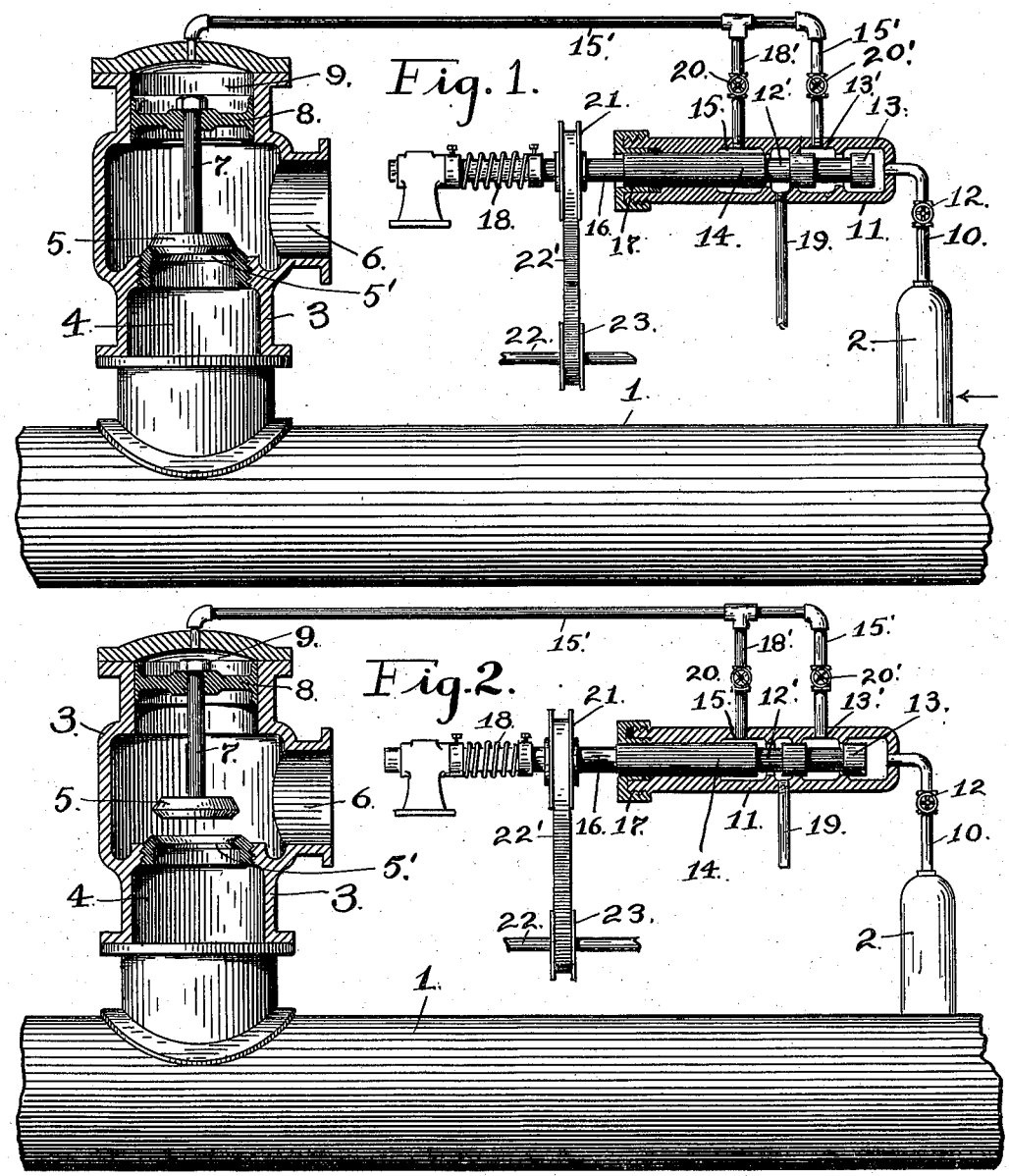
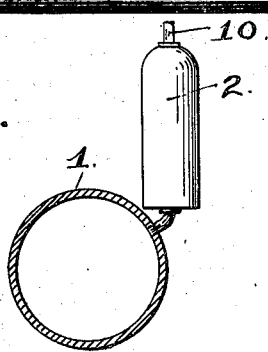
Witnesses:
Arthur L. Lee.
J. Compton.
Inventor.
Geo. J. Henry, Jr.
by N. A. Acker
his Atty.

UNITED STATES PATENT OFFICE.

GEORGE J. HENRY, JR., OF SAN FRANCISCO, CALIFORNIA.

SAFETY MEANS FOR FLUID-PRESSURE LINES.

No. 853,785.  Specification of Letters Patent.  Patented May 14, 1907.

Application filed August 29, 1905. Serial No. 276,252.

*To all whom it may concern:*

Be it known that I, GEORGE J. HENRY, Jr., a citizen of the United States, residing in the city and county of San Francisco, State of California, have invented certain new and useful Improvements in Safety Means for Fluid-Pressure Lines; and I do hereby declare the following to be a full, clear, and exact description of the same.

The present invention is for the purpose of automatically relieving any excess pressure that may occur in the main pipe line or conduit of hydraulic plants, to prevent breaks or strains that otherwise would result in damage to this main line pipe or conduit.

In the practical operation of hydraulic installations, it is often found necessary to quickly close the gate valve or nozzles of the water wheel apparatus, thereby checking quickly the flow of water in the main pipe line or conduit. This sudden checking of the water flow results in a water ram, which may reach such a high pressure as to burst the main line pipe or conduit, thus causing incalculable damage.

Numerous valve actuated devices have been designed to obviate this water ram due to the sudden checking of the water flow, but the objections thereto are that the pressure must rise considerably above the normal in order to open the relief valve employed, which when once opened, the high velocity of discharge fluid is such as to maintain the relief valve opened until the pressure has reduced considerably below the normal, thus causing fluctuation in the main pressure line. Again, when the relief valve is held to its seat by the pressure exerted thereon, the difference in pressure necessary to open the same must be very slight in order to prevent a considerable rise above the normal pressure in the main line pipe or conduit. This slight difference in pressure is all that holds the relief valve seated, therefore there is a tendency toward leakage between the valve and its seat, and the introduction of the slightest sediment, leaves, sticks or the like, contained in the flowing water prevents the valve closing tight against its seat. Therefore the surfaces are apt to be quickly cut and corroded in practice and the relief valve to become inoperative.

The object of the present invention is to dispose of the foregoing objections to the use of the existing pressure relief means, at the same time producing a less complicated and more sensitive mechanism for the relief of the excess pressure in the pipe line.

To comprehend the invention reference should be had to the accompanying sheet of drawings, wherein Figure 1 is a side view in elevation disclosing the safety means connected to the main line pipe or conduit, said conduit being broken away, the relief valve casing and the cylinder for the pressure actuated pilot piston valve being sectioned, the relief valve being illustrated closed and the pressure actuated valve being illustrated opened to admit of water pressure into the piston chamber of the relief valve casing for holding the said valve into its seat; Fig. 2 is a similar view to that set forth in Fig. 1 of the drawings, the relief valve being illustrated in an opened position and the pressure actuated pilot piston valve being illustrated in closed position to cut off the water pressure supply into the piston cylinder of the relief valve casing; and Fig. 3 is an end view in elevation, viewed in the direction of the arrow, Fig. 1 of the drawings.

In the drawings, the numeral 1 is used to designate the main line pipe or conduit for the water, and 2 is a settling chamber or reservoir which communicates therewith to receive a portion of the water flowing through the main line pipe or conduit. This settling chamber or reservoir is preferably set at an angle lateral to the main line pipe or conduit, extending from one side thereof a slight distance below the water level within the pipe or conduit 1. The reason for thus locating the settling chamber or reservoir, is to avoid the heavy sediment moving along the bottom portion of the pipe or conduit and the floating leaves, pine needles, sticks carried at the top of the flowing body of water from entering or being carried into the said chamber or reservoir, the purpose of which chamber or reservoir is to maintain under pressure a body of clear water, free from foreign substances which would clog the valves of the safety means.

The pipe line or conduit 1 is provided with a relief valve casing 3, within the receiving chamber 4 of which works the valve 5, said valve controlling communication between the receiving chamber 4 and the overflow outlet 6, for the escape of water to relieve the main line pipe or conduit of an excess water pressure, when the flow of water therethrough is suddenly checked.

The stem 7 of the valve 5 is provided with a piston head 8, which works within the piston cylinder portion 9 of the valve casing.

From the settling chamber or reservoir 2 extends the pipe 10, which connects the same with the cylinder 11, the quantity of water flowing through the said pipe being regulated by an adjusting valve 12 fitted therein.

Within the cylinder 11 works a pressure actuated pilot piston valve 12', the head 13 of which controls the outlet port 13' and the head 14, the inlet port 15, of the cylinder 11. The stem 16 of the pilot piston valve 12' extends through a stuffing gland 17, an inward pressure being exerted thereon by the spring 18, the pressure of which holds the said pilot valve 12' to normally maintain uncovered the port 13', and closed the port 15.

The cylinder 11 connects with the piston cylinder 9 of the valve casing 3, so that when the port 13' is uncovered, there is a constant pressure of water maintained from the main line pipe or conduit 1, onto the piston head 8, through the medium of the settling chamber or reservoir, cylinder 11 and the connecting pipes, which pressure is sufficient to counterbalance the water pressure on the under face of the valve 5 and to hold the said valve firmly seated against the normal pressure of the water flowing through the main line pipe or conduit.

The operation is as follows: During the flow of the water through the main line pipe or conduit 1, under normal pressure, the parts stand positioned relatively to each other as disclosed by Fig. 1 of the drawings, the pressure exerted against the piston head 8 of the relief valve being greater than that exerted against the under face of the said valve, and therefore, firmly holding the said relief valve seated. The moment the pressure in the main line pipe or conduit rises above normal, such pressure acts against the pilot valve piston within the cylinder 11, and forces the same outwardly and compresses the spring 18 on the stem thereof, the said pilot valve being thus moved to close the port 13' of the cylinder 11, and to open the ports 15 and 19, thus relieving the fluid pressure within the cylinder 9, when the pressure exerted on the under face of the relief valve 5 overcomes the pressure within the piston cylinder 9, which lifts or unseats the said relief valve in accordance with the excess pressure within the main line pipe or conduit, uncovering the port 5' and permitting an escape of water through the overflow outlet 6. The upward movement or unseating of the said relief valve causes a displacement of the water within the cylinder 9, forcing the water back through the connecting pipe 15' and branch pipe 18' into the cylinder 11, whence it makes its escape through the discharge port 19.

It is obvious that inasmuch as only a slight quantity of fluid is required to compensate for the varying pressure on the piston head 8, of the cylinder 9, or for each movement or stroke of the pilot valve within the cylinder 11, that oil may be utilized as the fluid medium for the actuating of the said pilot valve.

It is apparent that what has been designated as a settling chamber or reservoir 2, may be constructed of but slight diameter, in fact, it may consist of simply a pipe connection, inasmuch as the slow movement of the fluid through such pressure pipe or reservoir will prohibit the carrying of sediment, leaves, or sticks therethrough into the valve mechanism, and consequently the fluid contained therein will be what has heretofore been termed clear fluid under pressure.

The flow of water through the connecting pipe 15' and the branch pipe 18', may be controlled respectively by means of the valves 20' and 20.

During the outward movement of the pressure actuated pilot piston valve 12', the spring 18 is compressed, the pressure of which tends to force the said pilot valve inward to close the ports 15 and 19, and to open the port 13'. The moment the pressure within the main pipe line or conduit is reduced, the pressure of the spring 18 gradually forces the pilot valve 12' inward so that by the time the pressure within the pipe line or conduit falls to normal, the said valve 12' will stand in such a position as to close the ports 15 and 19, and open the port 13', permitting the pressure of the water entering the piston cylinder 9 to close or seat the valve 5, and close the escape of water from the receiving cylinder 4, Fig. 2 of the drawings.

When the pressure within the main line pipe or conduit is normal, the water within the settling chamber or reservoir 2 is still water under pressure.

To maintain clean the seats of the heads of the pilot piston valve and perhaps secure more accurate regulation, the stem of the said pilot piston valve may be continually rotated, so that the said piston valve will float between the spring and water pressures, and be much more sensitive in its operation. This is accomplished by securing to the stem 16 of the pilot piston valve a belt wheel 21, which is connected to a driven shaft 22 by the belt 22', which works over the wheel 21 and the pulley 23, on the driven shaft 22. This shaft is rotated by any suitable mechanism, not shown.

Having thus described the invention, what is claimed as new and desired to be protected by Letters Patent is—

1. The combination with a main line supply pipe or conduit, of a relief valve casing connected therewith, a pressure actuated relief valve held therein, an overflow outlet controlled by said valve, a settling reservoir or chamber connected with the main line pipe or conduit, of connections between said reservoir and the relief valve casing for establishing a pipe line pressure to hold the relief valve seated against normal pressure, and a pilot valve interposed within said connections, which valve is actuated in accordance with pressure variations in the pipe line or conduit to control the movement of the relief valve.

2. The combination with a main line pipe or conduit, for water, of a relief valve associated therewith for controlling a water discharge when the pressure within the said line pipe or conduit rises above normal, of a pilot valve, a settling chamber or reservoir, of connection between the reservoir and the pilot valve, and connection between said valve and the relief valve, said pilot valve being actuated by a variance in the pressure exerted in the line pipe or conduit.

3. The combination with a main line pipe or conduit, of a relief valve connected therewith to open upon a pressure above normal in the pipe line or conduit to permit of an outlet of water, of connection between the said pipe line or conduit to hold the relief valve firmly seated against normal pressure of the water flowing through the pipe line or conduit, and of a rotatable pilot valve interposed within said connection for regulating the pressure of the relief valve in accordance with varying pressures in the main line or pipe line or conduit.

4. The combination with a main line pipe or conduit, of a relief valve connected therewith to open upon a pressure above normal in the pipe line or conduit to permit of an outlet of water, of connection between the said pipe line or conduit to hold the relief valve firmly seated against normal pressure of the water flowing through the pipe line or conduit, of a pilot valve interposed within said connection for regulating the pressure of the relief valve in accordance with varying pressures in the main line or pipe line or conduit, and means for imparting rotation to the pilot valve.

5. The combination with a main line pipe or conduit, of a relief valve connected therewith to open on the pressure in the pipe line or conduit rising above normal, of connection between the said pipe line or conduit and relief valve to hold the relief valve firmly seated against the normal pressure of the fluid flowing therethrough, and means interposed within said connection for relieving the relief valve of a closing pressure, when the pressure in the pipe line or conduit rises above normal and maintaining the closing pressure for the relief valve released until the pressure in the pipe line or conduit falls to normal.

In testimony whereof I have hereunto affixed my signature in the presence of witnesses.

GEORGE J. HENRY, JR.

Witnesses:
N. A. ACKER,
D. B. RICHARDS.